United States Patent
El Akel et al.

(10) Patent No.: US 9,465,968 B2
(45) Date of Patent: Oct. 11, 2016

(54) OPTICAL GRID ENHANCEMENT FOR IMPROVED MOTOR LOCATION

(71) Applicant: Intermec IP Corp, Fort Mill, SC (US)

(72) Inventors: Khalid El Akel, Castanet-Tolosan (FR); Jean-Pierre Stang, Toulouse (FR); Bernard Serres, Toulouse (FR)

(73) Assignee: Intermec IP Corp., Fort Mill, SC (US)

( * ) Notice: Subject to any disclaimer, the term of this patent is extended or adjusted under 35 U.S.C. 154(b) by 0 days.

(21) Appl. No.: 14/640,504

(22) Filed: Mar. 6, 2015

(65) Prior Publication Data

US 2015/0178537 A1    Jun. 25, 2015

Related U.S. Application Data

(63) Continuation of application No. 13/616,367, filed on Sep. 14, 2012, now Pat. No. 8,976,368.

(60) Provisional application No. 61/535,007, filed on Sep. 15, 2011.

(51) Int. Cl.
| | |
|---|---|
| *G01B 11/14* | (2006.01) |
| *G01B 11/16* | (2006.01) |
| *G01B 11/28* | (2006.01) |
| *G06K 7/10* | (2006.01) |
| *G01B 11/25* | (2006.01) |
| *G02B 7/09* | (2006.01) |

(52) U.S. Cl.
CPC ........... *G06K 7/10851* (2013.01); *G01B 11/14* (2013.01); *G01B 11/25* (2013.01); *G02B 7/09* (2013.01); *G01B 11/16* (2013.01); *G01B 11/167* (2013.01); *G01B 11/28* (2013.01)

(58) Field of Classification Search
USPC ...................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 3,351,768 A | | 11/1967 | Cooke | |
| 3,724,923 A | * | 4/1973 | Fischer | G06T 1/0007 250/202 |
| 4,348,592 A | * | 9/1982 | Kimura | G06K 9/36 250/559.07 |
| 4,378,465 A | * | 3/1983 | Green | G06F 3/046 178/18.07 |

(Continued)

*Primary Examiner* — Tri Ton
*Assistant Examiner* — Jarreas C Underwood
(74) *Attorney, Agent, or Firm* — Additon, Higgins & Pendleton, P.A.

(57) ABSTRACT

Methods for performing a scheme that results in a refined measurement pattern within an optical grid are provided. Physically adjusting spacing of elements within an optical grid to achieve enhanced resolution is historically unfeasible, as reduction of the spacing causes light sensors of the optical grid to pick up false signals when reading light beams. Technology introduced by the present invention generates a virtual reduced spacing of the elements within the optical grid by using two signals that are slightly different. These slightly different signals can accomplish, at least, quarter-grid spacing resolution within the optical grid. Additionally, the enhanced resolution derived from the virtual reduced spacing is employed to govern movement of a motor. The motor movement is in response to one or more changes of direction such that the motor is operating in its linear range. Advantageously, the virtual reduced spacing allows for substantial movement in a non-linear phase, while only limited movement in a linear phase is necessary to locate accurately a target within the optical grid.

20 Claims, 6 Drawing Sheets

(56) References Cited

U.S. PATENT DOCUMENTS

| | | |
|---|---|---|
| 4,402,609 A | 9/1983 | Fetzer et al. |
| 4,446,481 A * | 5/1984 | Edamatsu ............... B07C 5/10 250/559.26 |
| 6,528,783 B1 | 3/2003 | Mortara et al. |
| 6,909,516 B1 * | 6/2005 | Hoover ................. G01D 5/347 347/116 |
| 7,633,618 B2 * | 12/2009 | Monshouwer ......... G01B 11/27 257/797 |
| 8,976,368 B2 | 3/2015 | El Akel et al. |

* cited by examiner

OPTICAL GRID ENHANCEMENT FOR IMPROVED MOTOR LOCATION

CROSS-REFERENCE TO RELATED APPLICATIONS

The present application claims the benefit of U.S. patent application Ser. No. 13/616,367 for Optical Grid Enhancement for Improved Motor Location filed Sep. 14, 2012 (and published Mar. 20, 2014 as U.S. Patent Application Publication No. 2014/0078515), now U.S. Pat. No. 8,976,368, which claims the benefit of U.S. Provisional Application No. 61/535,007 for Optical Grid Enhancement for Improved Motor Location filed Sep. 15, 2011. Each of the foregoing patent applications, patent publication, and patent is hereby incorporated by reference in its entirety.

BACKGROUND

This invention relates to a employing an optical grid to monitor and control movement of a device. More particularly, employing a processing unit to implement an improved scheme for sending and processing beams of light within an optical grid and using the output of the processing unit to control piezo movement of a motor is disclosed.

Generally, off-the-shelf optical grids allow high measurement accuracy. As used herein, the phrase "optical grid" represents a linear arrangement of optical elements, where each optical element is located at a precise distance from the previous optical element. These optical elements may include "light sources," which emit a beam of light, and "light sensors," which become excited by variations in light and detect whether the beam of light is reflected back. Thus, the light sources and the light sensors work in conjunction to measure a position on the optical grid. Often, the light sources and light sensors are paired in a one-to-one ratio.

Further, some piezo motors offer poor resolution because they are limited by the wavelength of the light beams. In the application of locating a lens quickly and accurately using these piezo motors, location errors smaller than the grid spacing cause discernible focusing problems with a barcode imager. This sensor tolerance, coupled with non-linear movement of the piezo motor, rarely allow even quarter grid positioning of the lens to be achieved.

Generally, the present invention resolves the situations of inaccurate piezo motor location for the purpose of auto-focus imaging in a barcode scanner at a price commensurate with current devices (i.e., without additional hardware or more expensive motors).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Generally, embodiments of the present invention may be described as two interwoven concepts: accurate measurement of a location of a physical object on an optical grid using a beam of light and two slightly offset detectors; and accurate positioning of the piezo motor over the target using an intelligent movement scheme. Specifically, "accurate measurement" deals with the improvement upon the level of detail in positional information that can be obtained by an optical grid (e.g., a light source and multiple receptors) of a physical object (e.g. a camera lens) as it is moved via a piezo motor. On the other hand, "accurate positioning" deals with a characterization of the piezo motor using the positional information in order to operate in the motor's linear range, thus, finding the exact location of a target (goal position) between optical grid elements.

In particular, embodiments of the present invention, computer-readable media is provided for, among other things, performing a scheme that results in a refined measurement pattern within an optical grid. Within conventional systems, physically adjusting spacing of elements within an optical grid to achieve minimal positional discrepancy is limited, as physical reduction of the spacing causes the light sensors of the optical grid to pick up interfering signals when reading light beams. In contrast, the technology introduced by the present invention generates a virtual reduced spacing of the elements within the optical grid using two signals that are physically offset from one another. These slightly offset signals can accomplish quarter-grid spacing resolution from any optical grid. The enhanced resolution derived from the virtual reduced spacing is then combined with an accurate characterization of movement of a piezo motor (e.g., using a novel motor movement algorithm), thereby allowing operation in a linear-motion phase of the motor during a critical portion of locating the lens.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
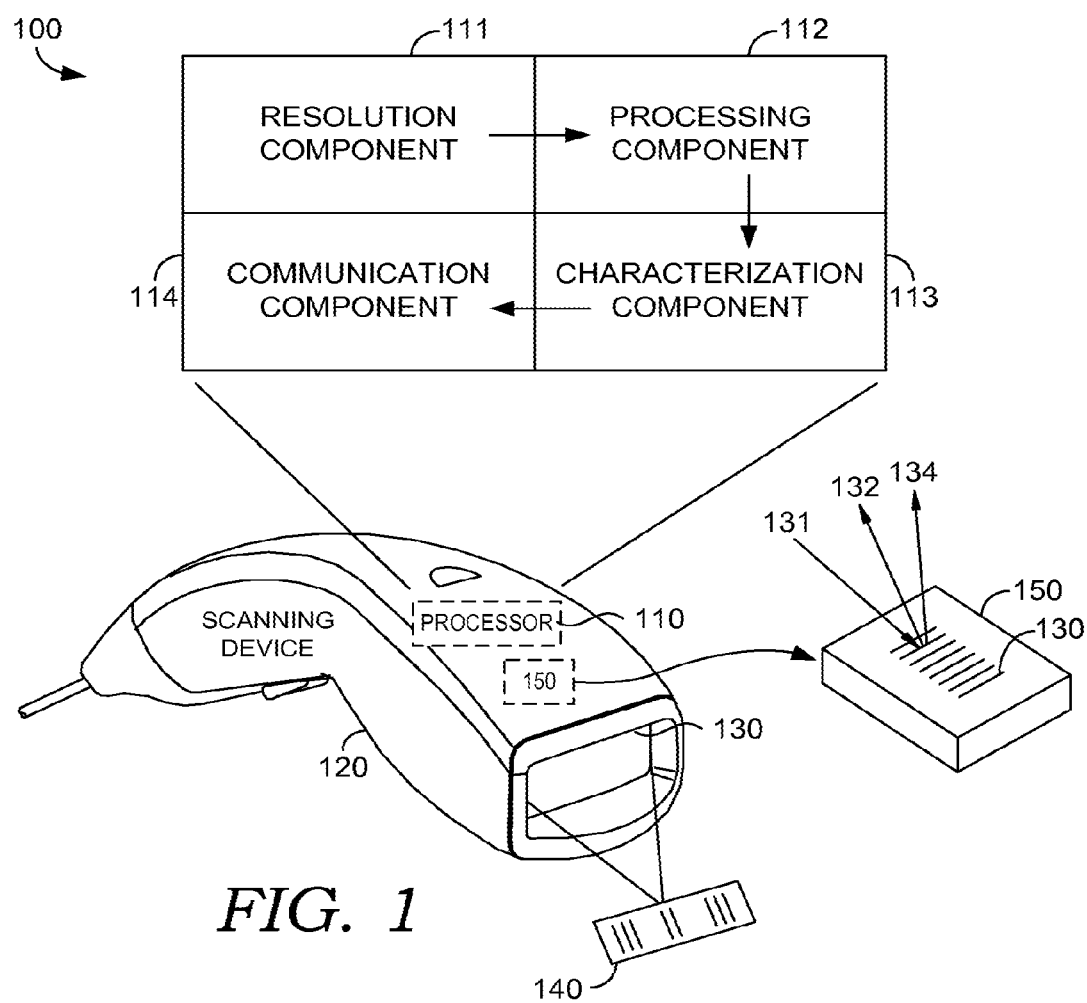
FIG. 1 is a schematic diagram of an exemplary system architecture suitable for use in implementing embodiments of the present invention.

Embodiments provide media and methods for locating a physical object in relation to an optical grid using an innovative technique to achieve high resolution and programming a motor with a scheme that rapidly adjusts a physical object (e.g. a camera lens) to a precise and desired position. In other words, technology introduced herein relates to virtually reducing spacing of elements within an optical grid (achieving high resolution), and utilizing a motor to locate a physical object between the elements (employing the scheme).

Initially, an exemplary method for virtually reducing spacing of elements within an optical grid includes the step of receiving input from a light sensor configured to read a first beam of light and a second sensor configured to read a first beam of light. Typically, the first beam of light is detected by a sensor that is spatially offset from the second sensor. Based on the input from the light sensors, software is provided to derive a pattern of transitions as a function of the spatial offset between the first-beam sensor and the second-beam sensor. In instances, deriving the pattern of transitions involves the following actions: measuring when the curve of the first-beam wavelength produces a high signal; measuring when the curve of the second-beam wavelength produces a high signal; and applying an algorithm to the measurements to identify a transition when either the first-beam wavelength or the second-beam wavelength exclusively produces the high signal. Once derived, the pattern of transitions is recorded in association with clock cycles that separate each transition therein.

Next, the exemplary method for utilizing a motor to locate a physical object between the elements includes providing a pattern of transitions derived from measuring locations of one or more beams refracted from an optical grid. The method may further involve calibrating the motor by counting clock cycles of spacing that separate adjacent transitions within the pattern of transitions. The motor is then operated in a forward direction at a non-linear rate to scan the pattern of transitions. Generally, the process of scanning includes the following steps: identifying the target encountered when moving in the forward direction; and recording clock cycles to reach the target that elapsed since passing a transition of the pattern of transitions, wherein the transition is passed immediately before encountering the target.

Upon encountering the target, the motor is operated in a reverse direction until the target and the transition immediately before the target are passed again. At this point, the motor is operated in the forward direction at a linear rate to relocate the target, wherein locating includes: beginning movement from the transition immediately before the target while counting down the recorded clock cycles; and stopping the motor upon completion of counting down the recorded clock cycles. It is intended that the position of the motor upon stopping corresponds with a location of the target on the optical grid.

As one skilled in the art will appreciate, embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media can be any available media that can be accessed by computing device 100 and includes both volatile and nonvolatile media, removable and nonremovable media. By way of example, and not limitation, computer-readable media may comprise computer-readable storage media and communication media. Computer-readable storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100.

Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

In embodiments, the invention may be described in the general context of computer code or machine-useable instructions, including computer-executable instructions such as program modules (e.g., components 111-114 of FIG. 1), being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

These computing device(s) may include a bus that directly or indirectly couples the following devices: memory, one or more processors 110 of FIG. 1, one or more presentation devices, input/output (I/O) ports, and a power supply. The processor 110 may be coupled to or provisioned with memory. Memory includes computer-readable storage media in the form of volatile and/or nonvolatile memory. The memory may be removable, nonremovable, or a combination thereof. Exemplary hardware devices include solid-state memory, hard drives, optical-disc drives, etc. The processor 110 may be coupled presentation device(s) that are configured to present data indications to a user or other device. Exemplary presentation devices include a display device, speaker, printing component, vibrating component, etc.

Referring to the drawings in general, and initially to FIG. 1 in particular, a schematic diagram of an exemplary operating environment 100 is shown. The illustrative operating environment 100 includes, in one embodiment, a scanning device 120, a barcode 140, a piezo motor 150 and an associated optical grid 130. The scanning device 120 includes at least one light emitter 131 that produces a beam of light to impinge on the optical grid 130, and corresponding light sensors 132 and 134 to read the beams of light as they refract from the optical grid pattern 130. As illustrated, the light emitter 131 emits a first beam of light, where a position of a first detector of light 132 is typically spatially offset from a position of the second detector of light 134. In this way, a curve of the timing of the first-beam and a curve the timing of the second-beam are out-of-phase. Although only one light emitter 131 is shown, it should be understood and appreciated that any number of light emitters, positioned and orientated in any manner, may be employed to impinge on the optical grid 130. Further, although the various components of FIG. 1 are shown with lines for the sake of clarity, in reality, delineating various components is not so clear, and metaphorically, the lines would more accurately be grey or fuzzy. Even further, although some devices of FIG. 1 are depicted as single images, the depictions are exemplary in nature and in number and are not to be construed as limiting (e.g., although only two light sensors 132 and 134 are depicted, a single detector with an electronic delay or three or more detectors may be operably coupled to the scanning device 120). Further, the scanning device 120 may be coupled to the piezo motor 150 (wired, wirelessly, or a combination thereof). Furthermore, the scanning device is only an example application of the current invention. Other uses include but are not limited to an auto-focus camera, a precision drawing device, a mechanical actuator and in fact, any application in which a piezo motor or any mechanical movement device is utilized.

The scanning device 120 includes the piezo motor 150 which is configured to receive optical transmissions (beams of light) from the light emitter 131 via the light sensors 132 and 134. In addition, the scanning device 120 may be configured to convey information to the piezo motor 150 (e.g., utilizing an embedded radio, antenna, or other device). In embodiments, the scanning device 120 may be, or variously referred to as, a handheld device, mobile handset, consumer electronic device, a rugged industrial device (e.g., bar-code scanner), cell phone, personal digital assistant (PDA) unit, and the like.

Additionally, the scanning device 120 may be configured to present a user interface (not shown) and even to receive inputs at an input component, in embodiments. The user interface may be presented on any presentation component that may be capable of presenting information to a user. In an exemplary embodiment, user interface presents messages (e.g., alert, sound, blinking light, or any other visual indication) to an operator upon reading the barcode 140. The input component may be a touch screen, a keypad, a joystick, trackball, touch-pad, input-receiving screen, trigger (as shown), and the like. In operation, the input component may receive inputs from a user for processing, at least initially, at the scanning device 120.

The scanning device 120 may include computer readable media running on computer-executable instructions, as discussed above, where the computer-executable instructions are carried out by a processor 110. In operation, the processor 110 is designed to enhance recognition of visual elements (e.g., darkened lines or spaces between the lines) on the barcode 140 by focusing precisely and to finely tune the functionality of the piezo motor 150 (e.g., communicating the feedback of the optical grid 130 with a controller in the piezo motor 150).

In embodiments, the processor 110 represents a computing unit (e.g., central processing unit, microprocessor, etc.) to support operations of the component(s) running thereon (e.g., resolution component 111, processing component 112, characterization component 113, and communication component 114). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled to, the scanning device 120 to enable performance of communication-related processes and other operations (e.g., capturing beams of light, interesting the wavelengths composing the beams, generating a pattern of transactions from the wavelengths, and the like). In another instance, the computing unit may encompass the processor 110 coupled to the computer readable medium accommodated by the scanning device 120. Generally, the computer-readable medium stores, at least temporarily, a plurality of computer software components that are executable by the processor 110. As utilized herein, the term "processor" is not meant to be limiting and may encompass any elements of the computing unit that act in a computational capacity. In such capacity, the processor 110 may be configured as a tangible article that processes instructions. In an exemplary embodiment, processing may involve fetching, decoding/interpreting, executing, and writing back instructions.

The feature of optical grid enhancement will now be discussed with reference to the components 111-114. Initially, the resolution component 111 receives indications of input(s) to the light sensor, where the input(s) may be a detection of one or more beams emitted by respective light sources. These beams are typically generated with the same signal characteristics (e.g., frequency and wavelength), but with an offset in their position, or out-of-phase, relative to one another (e.g., Channel A is initiated slightly before Channel B.) This out-of-phase disposition of the light beams allows the light to hit the optical grid 160 a fraction of a grid spacing apart as the physical object is translated by the piezo motor 150 in front of the optical grid 130. As the beam or non-synchronous beams of visible or IR or UV light are emitted from the light source 131 and refracted back to two or more light sensors 132 and 134, the light sensors 132 and 134 communicate with the resolution component 111 to interpret the feedback from the light sensors 132 and 134. In embodiments, interpreting may include the following steps: recognizing two separate signals from the light sensors 132 and 134, where the signals each represent the light beam; and performing an "exclusive or" operation. Typically, the processing component 112 is employed to assist with the "exclusive or" operation, which comprises: measuring when a curve of the first-beam wavelength (emitted from light emitter 131 and received as Channel A) produces a high signal; measuring when a curve of the second-beam wavelength (emitted from light emitter 133 and received as Channel B) produces a high signal; and applying an algorithm to the measurements to identify a "transition" when either the first-beam wavelength or the second-beam wavelength exclusively produces the high signal.

In an exemplary embodiment, when one curve has a high signal while the other has a low signal, upon comparison, a value of 1 is assigned. On the other hand, when both curves are combined from Channels A and B and they are similar in signal (i.e., both are high or low), a value of 0 is assigned. A switch from a value of 0 to a value of 1 is visually represented by a transition, or peaked area, on the pole curve. That is, each transition occurs when Channel A is high and Channel B is not, or when Channel B is high and Channel A is not. This graphical depiction, of "pattern of transitions," of transactions within a pole curve achieves a $\lambda/4$ positional accuracy (resolution) of the location of the piezo motor 150. That is, with the help of the processing component 112, the optical grid 130 can generate an enhanced quarter-wavelength ($\lambda/4$) resolution, thus, achieving essentially ultra-high resolution for a 30% cost reduction in the price difference between the piezo motor 150 and a magneto-resistive motor. This quarter-wavelength resolution is employed to locate a goal within the optical grid 130. For instance, as will discussed in detail below, when the goal, or target (reference numeral 220 of FIG. 2), falls in-between transitions of the pole curve, clock cycles are counted from the most proximate peak before the target to determine a distance thereto.

Figure 2:
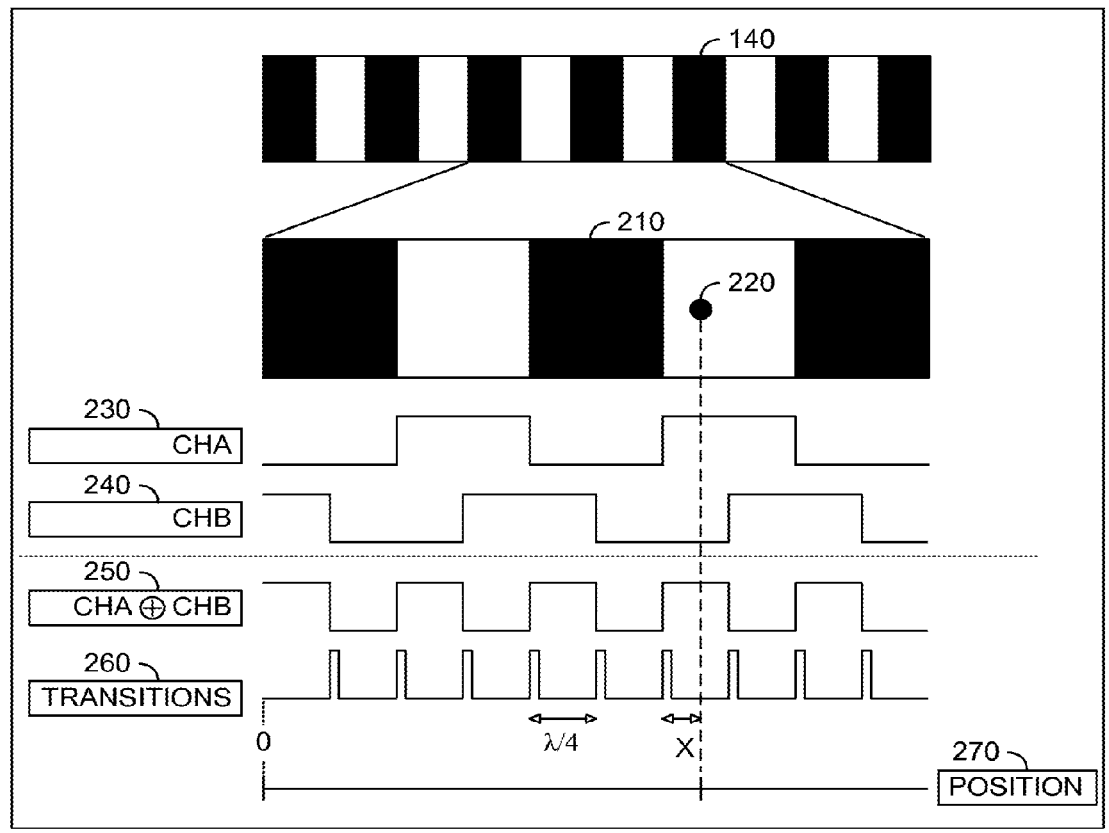
FIG. 2 is a schematic diagram showing a scheme for interpreting two beams of light to produce a minimized pattern of transitions for locating a lens on a barcode, in accordance with an embodiment.

The concept of generating a pattern of transitions will now be described with reference to FIG. 2. Generally, FIG. 2 represents a schematic diagram showing a scheme for interpreting two beams of light to produce a minimized pattern of transitions 260 for locating a physical object such as a lens over a target 220 on the optical grid 130, in accordance with an embodiment, in this case the ideal focus point of a lens. As shown, a section 210 of the optical grid 130 is enlarged for purposes of discussion. The beam of light impinge on two detectors with positional offset by λ/4 are represented by Channel A (CHA) 230 and Channel B (CHB) 240. Alternately, a single detector with an electronic delay can be used to produce CHA and CHB. When the "exclusive or" operation is performed by combining the CHA 230 and CHB 240, as depicted by reference numeral 250, the pattern of transitions 260 is generated. As shown, the pattern of transitions 260 includes transitions, or peaks, that are spaced λ/4 and quarter resolution is achieved. The pattern of transitions 260 is used to determine a position 270 of the target 220 as a relative distance X from a transition proximate to the target 220, typically, by counting clock cycles as will discussed below.

Turning now to FIG. 1, performing "exclusive or" operation enables enhanced resolution, however, this algorithm is typically combined with a scheme for calibrating and moving the piezo motor 150 in order to translate a physical object such as a lens to be positioned over the target. That is, without the scheme, the piezo motor 150 may overshoot the target by one or two quarter wavelength grid segments provided in the enhanced resolution of the pattern of transitions. Accordingly, the characterization component is employed to assist with developing and enforcing the scheme 113.

In one instance, the characterization component 113 is configured to calibrate the piezo motor 150. Often, piezo motors are notorious for having a "non-linear operating region," which ramps up (accelerates) a rate of translation of a substrate, and a "linear region," which holds constant the speed of the substrate upon acceleration. Due to manufacturing variances and the nature of substrates, the line between these regions is generally difficult to predict with certainty. Accordingly, conventional applications that require highly linear motion cannot use the inexpensive piezo motors.

In an exemplary embodiment, calibration entails identifying the linear region of the piezo motor 150 so the manufacture (alignment) and circuitry can be optimized. In order to identify the linear region, an accurate characterization of the entire motor linearity is performed prior to assembly. Motor linearity generally refers to the variation in rate of movement (nonlinear region) of a substrate through the piezo motor 150 until the rate of movement is maintained at consistent rate (linear region).

Figure 3:
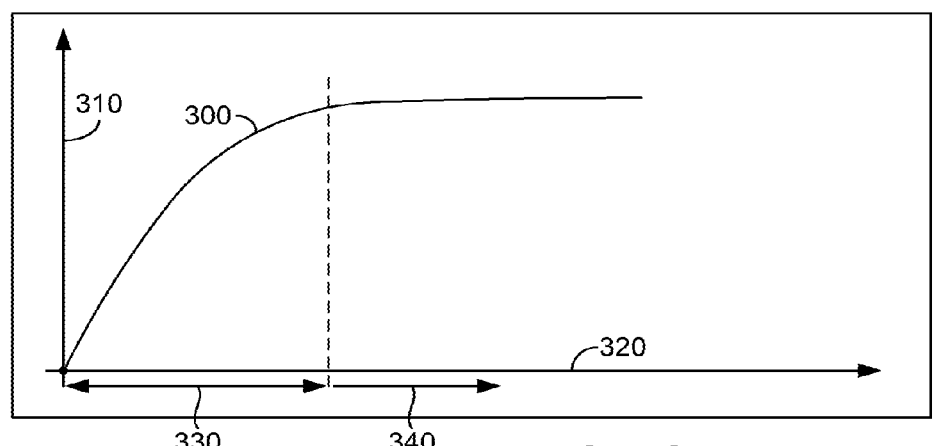
FIG. 3 is a diagrammatic model showing a characterization of movement of a piezo motor using a non-linear curve, in accordance with an embodiment.

Motor linearity will now be discussed with reference to FIG. 3. Generally, FIG. 3 depicts is a diagrammatic model showing a characterization of movement of a piezo motor using a non-linear curve 300, in accordance with an embodiment. The curve 300 is plotted on a graph with a Y-axis that represents a rate of travel (310) or speed of the substrate through the piezo motor, while the X-axis represents a distance 320 along the substrate at which the piezo motor has achieved a certain speed. As shown, the non-linear region of the curve 300 occurs of the distance 330, where the piezo motor is increasing in speed. The linear region of the curve 300 occurs beyond the dashed line at distance 340, where the piezo motor holds constant the speed of travel of the substrate. It is in the linear region that counting clock cycles will accurately locate the target within the pattern of transitions.

Returning to FIG. 1, once the piezo motor 150 is characterized, the non-linear region can be avoided by using an scheme involving the following steps: passing a target in a forward direction, reversing the direction of travel, and moving in the forward direction again to the target (in the exemplary embodiment, the target location as determined by a laser parallax measurement but any means of predetermining a target location can be used such as but not limited to light time-of-flight and sonic delay). By way of example, when reversing the direction of travel, the piezo motor 150 is reversed for two transitions and then moved in the forward direction. This allows the piezo motor 150 to accelerate to the linear region by the time is encounters the transition immediately before the target while maintaining the lens proximate to the target (i.e., avoiding wasting additional time consumed by traveling over large sections of the substrate).

During characterization, as carried out by the characterization component 113, a number of clock cycles between each transition in the linear region is recorded. These clock cycles are eventually used to find the target. For instance, if the target is positioned two-thirds of the way between a first and second transition and there are 90 clock cycles between transitions in the piezo motor's 150 linear region, the target will be encountered at 60 clock cycles past the first transition. Once this information concerning the characterization of the barcode 140 is determined, the communication component 114 is responsible for interacting with the piezo motor 150 to control operations thereof.

Figure 4:
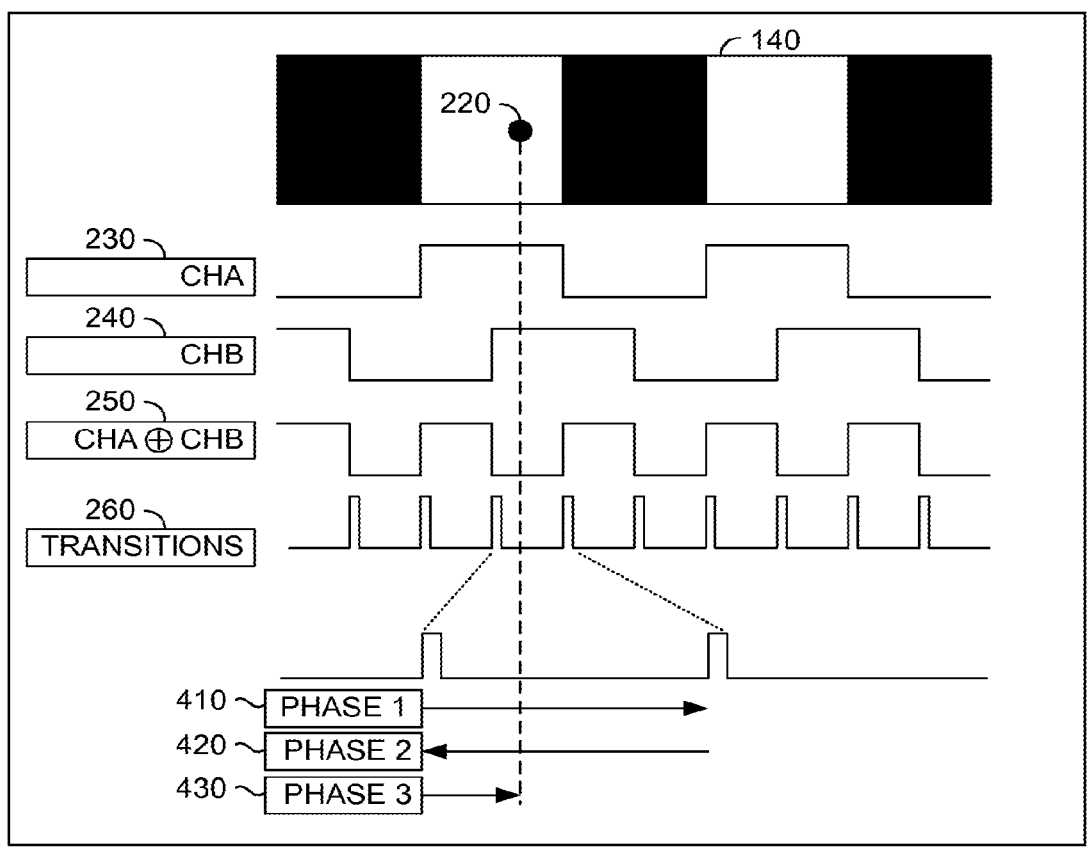
FIG. 4 is a schematic diagram showing process for moving the piezo motor with reference to the minimized pattern of transitions, in accordance with an embodiment.

Turning now to FIG. 4, the use of the pattern of transitions 260 that is characterized from the barcode 140 will be discussed. Generally, FIG. 4 represents a schematic diagram showing process for moving the piezo motor with reference to the minimized pattern of transitions 260, in accordance with an embodiment. Initially, at phase 1, the piezo motor arrives at the transition past the target 220. At phase 2, the piezo motor reverse one or more transitions until it is at a transition before the target 220. At this point, the piezo motor starts in the forward direction again, as indicated at phase 3. When the transition immediately before the target 220 is reached, a timer is started to count clock cycles. These clock cycles guide the piezo motor to the target 220 without further reference to the transitions. This scheme for conducting piezo-motor reversal over phases 1-3 (employing of the pattern of transitions 260) solves the problem arising from encountering the target 220 within the non-linear region of the curve, causing the piezo motor to overshoot the target 220. That is, the scheme described above ensures the piezo motor encounters the target 220 in the forward direction within the linear region (step 3), thus, arriving at the target 220 in a predictable fashion.

Figure 5:
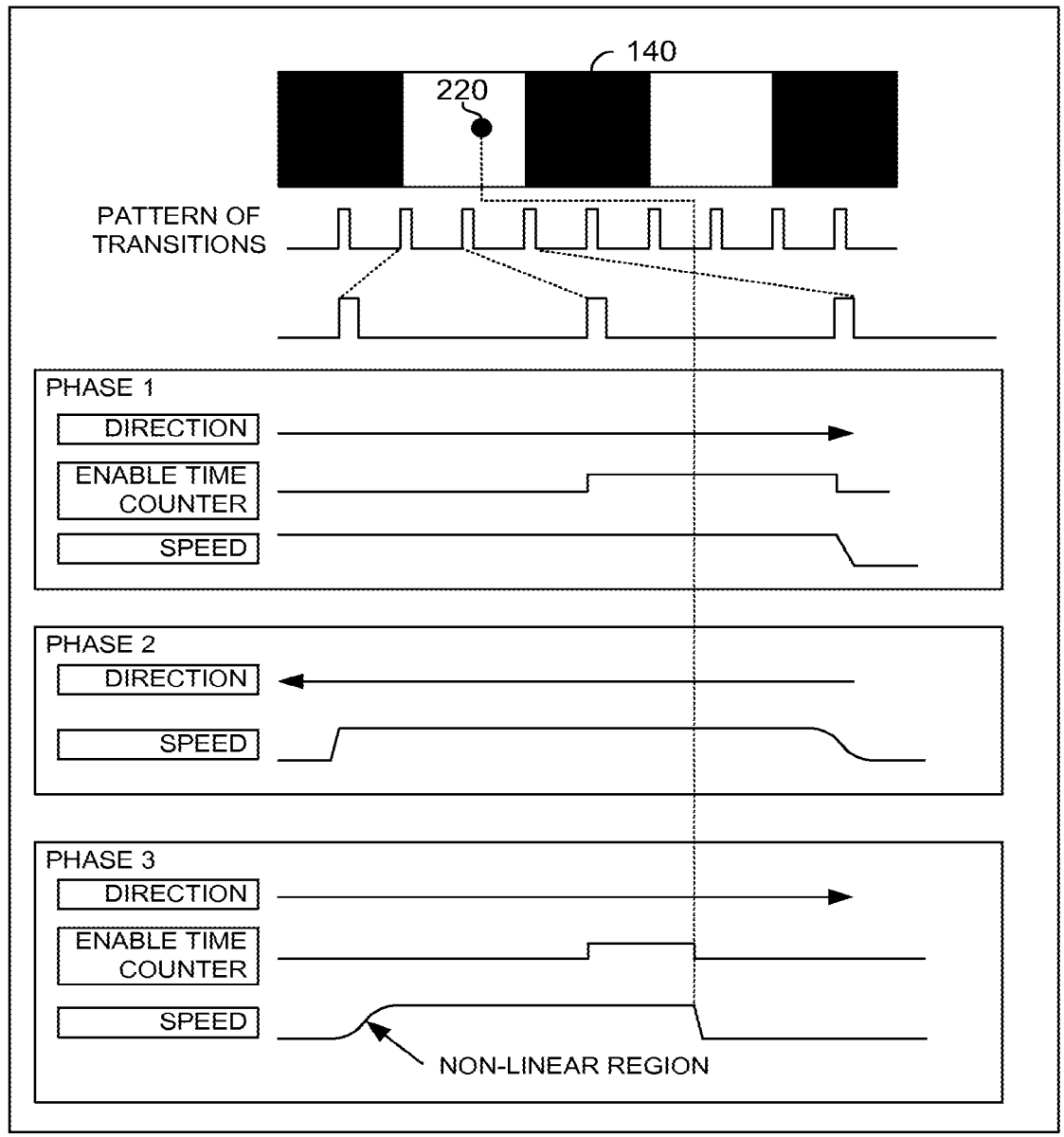
FIG. 5 is a schematic diagram showing an exemplary movement of the piezo motor upon encountering a target in order to bring a lens in focus on the target, in accordance with an embodiment.

With reference to FIG. 5, a schematic diagram showing an exemplary movement of the piezo motor to the target 220 in order to bring a lens in focus on the bar code 140 is shown, in accordance with an embodiment. Initially, when using the pattern of transitions, the individual transitions serve as boundaries or checkpoints that, when detected, indicate when to start or restart the timer mechanism. Accordingly, at phase 1, the piezo motor is moving in the forward direction while counting clock cycles in between each of the transitions within the pattern of transitions. During phase 1, the piezo motor will eventually overshoot the target 220 while operating in its linear range. At the time of passing over the target 220, the number of counted clock cycles between the latest transition immediately before the target 220, or "proximate transition," and the target 220 is recorded.

At phase 2, the piezo motor operated in a reverse direction of travel to a transition before the proximate transition. That is, the piezo motor backs up the barcode a predefined number of transitions, wherein the number of transitions is greater in distance than the distance 330 of FIG. 3 of the non-linear region of the curve 300. By backing up this distance 330, the piezo motor is ensured to overcome the non-linear region once the proximate transition is encountered while moving again in the forward direction. Also, the time counter is typically not enabled when reversing in phase 2, as the point of stoppage is determined by the transitions, as opposed to a number of clock cycles.

At phase 3, the piezo motor is again operated in the forward direction such that the piezo motor is moving at a rate beyond the non-linear region once the proximate transition is encountered. In this way, when the piezo motor passes the proximate transition in phase 3, the piezo motor is operating in the linear range of the curve, thus, exhibiting predictable movement. In addition, as the piezo motor passes the proximate transition in phase 3, the time counter is enabled to count clock cycles. Upon the clock cycles being presently counted match the previously recorded clock cycles from phase 1, the piezo motor stops. That is, the piezo motor continues for the fraction of the time between transitions that is needed to reach the target 220. (The piezo motor can stop instantaneously but not start instantaneously.) As such, stopping the piezo motor upon the counted clock cycles corresponding to the recorded clock cycles results in the lens being positioned directly above a location of the target 220 resulting in optimum focus on the barcode.

Figure 6:
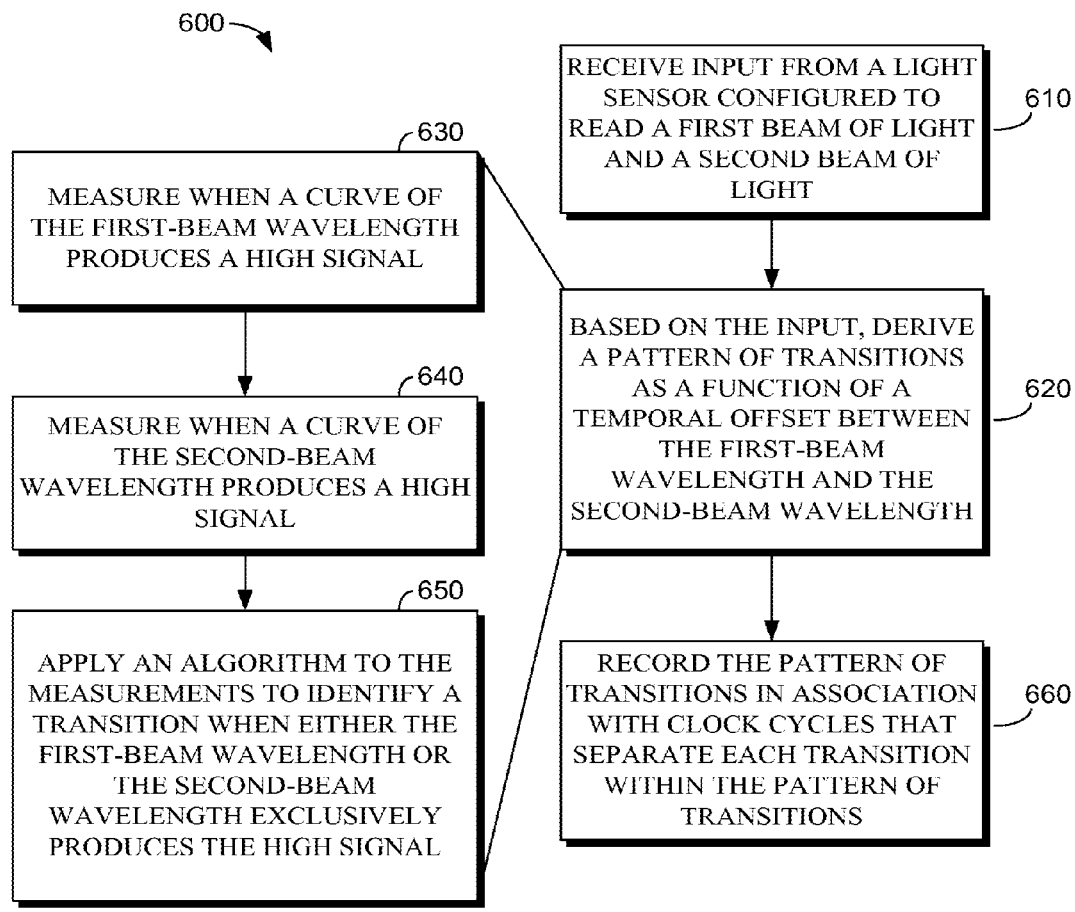
FIG. 6 is a flow diagram showing an overall method for virtually reducing spacing of elements within an optical grid, in accordance with an embodiment.

Turning now to FIG. 6, a flow diagram showing an overall method 600 for virtually reducing spacing of visual elements within an optical grid is shown in accordance with an embodiment. Initially, the method 600 includes the step of receiving input from a light sensor configured to read a first beam of light and a second beam of light, as indicated at block 610. Typically, the first beam of light is emitted with a wavelength that is spatially offset from a wavelength of the second beam of light. In this way, a curve of the first-beam wavelength and a curve the second-beam wavelength are out-of-phase. Based on the input from the one or more light sensors, software is provided to derive a pattern of transitions as a function of the spatial offset between the first-beam sensor and the second-beam sensor or for only one light source, a first and second sensor, as indicated at block 620. In instances, deriving the pattern of transitions involves the following actions: measuring when the curve of the first-beam wavelength produces a high signal (see block 630); measuring when the curve of the second-beam wavelength produces a high signal (see block 640); and applying an algorithm to the measurements to identify a transition when either the first-beam wavelength or the second-beam wavelength exclusively produces the high signal (see block 650). Once derived, the pattern of transitions is recorded in association with clock cycles that separate each transition therein, as indicated at block 660.

Figure 7:
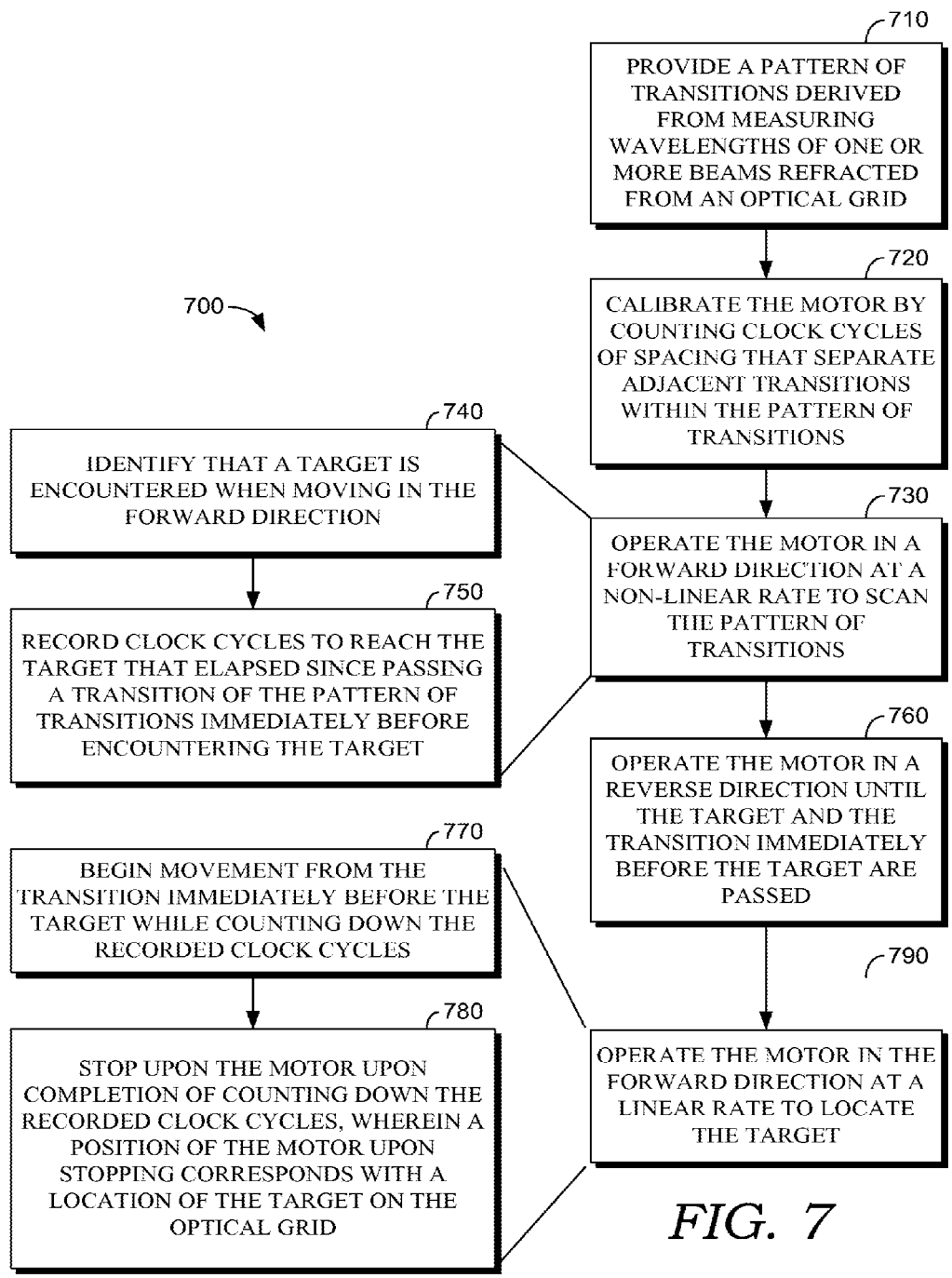
FIG. 7 is a flow diagram showing an overall method for utilizing a motor to locate a target between elements of a barcode, in accordance with an embodiment.

Turning now to FIG. 7, a flow diagram showing an overall method 700 for utilizing a motor to locate a target between visual elements of a barcode is shown in accordance with an embodiment. Initially, the method 700 involves providing a pattern of transitions derived from measuring wavelengths of one or more beams refracted from an optical grid, as indicated at block 710. The method 700 may further involve calibrating the motor by counting clock cycles of spacing that separate adjacent transitions within the pattern of transitions, as indicated at block 720. The motor is then operated in a forward direction at a non-linear rate to scan the pattern of transitions, as indicated at block 730. Generally, the process of scanning includes the following steps: identifying the target is encountered when moving in the forward direction (see block 740); and recording clock cycles to reach the target that elapsed since passing a transition of the pattern of transitions, wherein the transition is passed immediately before encountering the target (see block 750).

Upon encountering the target, the motor is operated in a reverse direction until the target and the transition immediately before the target are passed again, as indicated at block 760. At this point, as indicated at block 790, the motor is operated in the forward direction at a linear rate to relocate the target, wherein locating includes: beginning movement from the transition immediately before the target while counting down the recorded clock cycles (see block 770); and stopping the motor upon completion of counting down the recorded clock cycles (see block 780). It is intended that the position of the motor upon stopping corresponds with a location of the target on the optical grid.

Although various different configurations of the motor have been described, it should be understood and appreciated that other types of suitable devices and/or machines that translate a substrate or three-dimensional object (e.g., lens) from point A to point B may be used, and that embodiments of the present invention are not limited to the piezo motor described herein. For instance, embodiments of the present invention contemplate systems that are configured to translate an article forward and reverse with several non-linear regions in the operating curve, where the scheme is updated to ensure each of the non-linear regions is allowed to affect the positioning of the object.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A non-transitory computer-readable storage medium having computer-useable instructions embodied thereon for performing a method, the method comprising:
   virtually reducing spacing within an optical grid, wherein the virtually reducing of the spacing within the optical grid is comprised of:
   detecting wavelengths of light emitted from at least a single light source impinging upon the optical grid, wherein the detecting of the wavelengths is comprised of receiving input from a first beam of light by reading the first beam of light using a first sensor and a second sensor, wherein the first sensor is spatially offset from the second sensor, and
   based on the input, deriving a pattern of transitions as a function of the spatial offset between the first sensor and the second sensor, wherein the pattern of transitions includes one or more transitions that correspond with one or more visual elements, respectively, of the optical grid; and
recording the pattern of transitions in association with clock cycles that are stored against the one or more transitions therein.

2. The computer-readable storage media of claim 1, wherein deriving the pattern of transitions comprises measuring when a signal curve of the first-beam wavelength produces a high signal.

3. The computer-readable storage media of claim 2, wherein deriving the pattern of transitions comprises measuring when a signal curve of a second-beam wavelength produces a high signal.

4. The computer-readable storage media of claim 3, wherein deriving the pattern of transitions comprises applying an algorithm to the signal-curve measurements to identify a transition when either the first-beam wavelength or the second-beam wavelength exclusively produces the high signal.

5. The computer-readable storage media of claim 1, wherein the components of the optical grid comprise a first light source for emitting the first beam of light.

6. The computer-readable storage media of claim 5, wherein the components of the optical grid comprise a second light source for emitting a second beam of light.

7. A non-transitory computer-readable storage media having computer-useable instructions embodied thereon for performing a method of virtually reducing spacing of components within an optical grid by detecting wavelengths of light impinging upon the optical grid, the method comprising:
receiving input from a first beam of light emitted from a first light source by reading at least one sensor;
receiving input from a second beam of light emitted from a second light source by reading the at least one sensor, wherein the first beam is offset from the second beam;
based on the inputs, deriving a pattern of transitions as a function of the offset between the first beam and the second beam, wherein the pattern of transitions includes one or more transitions that correspond with one or more visual elements, respectively, of the optical grid, and wherein the pattern of transitions is derived upon the first beam of light and the second beam of light emitted from the first and second light sources, respectively, being refracted from the visual elements of the optical grid and being received by the at least one light sensor; and
recording the pattern of transitions in association with clock cycles that are stored against the one or more transitions therein.

8. The computer-readable storage media of claim 7, wherein a signal curve of the first-beam wavelength and a signal curve the second-beam wavelength are out-of-phase.

9. A computerized method for utilizing a motor to locate a target between visual elements of an optical grid, the method comprising:
accessing a pattern of transitions derived from measuring one or more beams refracted from the optical grid;
calibrating the motor by counting clock cycles of spacing that separate adjacent transitions within the pattern of transitions;
using the pattern of transitions to advance the motor in a forward direction at a first rate;
upon reaching the target, stopping the motor and counting clock cycles between the target and a transition, within the pattern of transitions, immediately before the target;
operating the motor in a reverse direction until the target and the transition immediately before the target are passed; and
using the counted clock cycles to advance the motor from the transition immediately before the target in the forward direction at a second rate to locate the target.

10. The computerized method of claim 9, comprising identifying the target is encountered when moving the motor in the forward direction.

11. The computerized method of claim 10, comprising recording the clock cycles that elapsed between passing a transition immediately before the target and encountering the target.

12. The computerized method of claim 11, wherein locating comprises beginning forward movement of the motor from the transition immediately before the target while counting down the recorded clock cycles.

13. The computerized method of claim 12, wherein locating comprises stopping movement of the motor upon completion of counting down the recorded clock cycles, wherein a position of the motor upon stopping corresponds with a location of the target on a barcode.

14. A computer system for performing a method of locating a target on a substrate, the computer system comprising a processor coupled to a computer-readable storage medium, the computer-readable storage medium having stored thereon a plurality of computer-software components executable by the processor, the computer software components comprising:
a resolution component that receives inputs from a light sensor provided within an optical grid, wherein the inputs indicate a beam of light refracting off the substrate and meeting the light sensor;
a processing component that performs an exclusive-or operation using the inputs received by the resolution component and that generates a pattern of transitions from results of the exclusive-or operation;
a characterization component that calibrates a motor, wherein the motor calibration determines a first operating region and a second operating region of the motor, and wherein the motor is configured to move the substrate forward or rearward with respect to the optical grid; and
a communication component that interacts with the motor to locate the target using the pattern of transitions, wherein locating the target comprises:
(a) identifying a particular transition within the pattern of transitions that exists a number of clock cycles before the target;
(b) counting down the number of clock cycles while the motor is moving the substrate within the second operating region from the particular transition toward the target; and
(c) instructing the motor to stop movement of the substrate upon the clock cycles being counted down, wherein the light sensor is substantially aligned with the target upon stopping the motor.

15. The computer system of claim 14, wherein at least one beam of light is emitted from a light source provided within the optical grid.

16. The computer system of claim 15, wherein beams of light are emitted with similar wavelengths, while a timing of the beams of light is offset such that the wavelengths are out of phase.

17. The computer system of claim 16, wherein the beams of light include a first beam of light and a second beam of light that includes a second-beam wavelength that is out of phase from a first-beam wavelength of the first beam of light.

18. The computer system of claim 17, wherein the processing component is configured to interpret the inputs received from the light sensor, and wherein interpreting comprises:
- recognizing two separate signals from the first beam of light;
- using the recognized signals to identify when a first-beam detector and a second-beam detector produce respective high signals; and
- performing the exclusive-or operation that determines a transition from the high signal exclusively produced by the first beam of light to the high signal exclusively produced by the second beam of light.

19. The computer system of claim 18, wherein the substrate represents an optical grid with visual elements that refract the first and second beams of light to the light sensor, and wherein the results of the exclusive-or operation include providing a quarter-wavelength resolution between the visual elements.

20. The computer system of claim 19, wherein the motor represents a piezo motor that advances the substrate forward or retracts the substrate rearward under the direction of the communication component.

* * * * *